United States Patent [19]
Marple

[11] Patent Number: 5,290,414
[45] Date of Patent: Mar. 1, 1994

[54] SEPARATOR/ELECTROLYTE COMBINATION FOR A NONAQUEOUS CELL

[75] Inventor: Jack W. Marple, Elyria, Ohio

[73] Assignee: Eveready Battery Company, Inc., St. Louis, Mo.

[21] Appl. No.: 883,444

[22] Filed: May 15, 1992

[51] Int. Cl.$^5$ .................... C25B 9/00; C25B 13/02; H01M 6/14; H01M 2/16
[52] U.S. Cl. .................. 204/252; 204/295; 429/194; 429/197; 429/247
[58] Field of Search .............. 204/252, 295, 296; 429/194, 197, 247

[56] References Cited

U.S. PATENT DOCUMENTS

| | | | |
|---|---|---|---|
| 3,996,069 | 12/1976 | Kronenberg | 429/197 |
| 4,071,665 | 1/1978 | Garth | 429/197 |
| 4,129,691 | 12/1978 | Broussely | 429/197 |
| 4,297,196 | 10/1981 | Lazarz et al. | 204/252 X |
| 4,482,613 | 11/1984 | Turchan et al. | 429/53 |
| 4,489,144 | 12/1984 | Clark | 429/196 |
| 4,498,961 | 2/1985 | Lazarz et al. | 204/252 X |
| 4,565,753 | 1/1986 | Goebel et al. | 429/194 X |
| 4,794,057 | 12/1988 | Griffin | 429/94 |
| 4,952,330 | 8/1990 | Leger et al. | 252/62.2 |
| 5,051,183 | 9/1991 | Takita et al. | 210/500.36 |
| 5,075,990 | 12/1991 | Greenberg et al. | 38/44 |
| 5,183,545 | 2/1993 | Branca et al. | 204/252 |

FOREIGN PATENT DOCUMENTS

| | | |
|---|---|---|
| 57-50772 | 3/1982 | Japan . |
| 59-173961 | 10/1984 | Japan . |
| 59-173977 | 10/1984 | Japan . |
| 1-134873 | 5/1989 | Japan . |

OTHER PUBLICATIONS

U.S. patent application Ser. No. 744,179 filed on Aug. 13, 1991.

*Primary Examiner*—Donald R. Valentine
*Attorney, Agent, or Firm*—Robert W. Welsh

[57] ABSTRACT

A separator/electrolyte combination for nonaqueous cells in which the electrolyte comprises a solute dissolved in a dioxolane and acyclic ether-based solvent, such as 1,2-dimethoxyethane, and the separator has a pore size between 0.005 and 5 microns, a porosity between 30% and 70%, a resistance between 2 and 15 ohm-cm$^2$, and a tortuosity of less than 2.5.

20 Claims, No Drawings

SEPARATOR/ELECTROLYTE COMBINATION FOR A NONAQUEOUS CELL

FIELD OF THE INVENTION

The invention relates to a nonaqueous electrolyte solution and separator combination for use in an electrochemical cell in which said electrolyte solution comprises a solute dissolved in a dioxolane and an acyclic ether-based solvent and said separator has specific pore size, porosity, resistance and tortuosity to provide unexpected improved high rate performance.

BACKGROUND OF THE INVENTION

The development of high energy battery systems requires the compatibility of an electrolyte possessing desirable electrochemical properties with highly reactive anode materials, such as lithium, sodium and the like, and the efficient use of high energy density cathode materials, such as $FeS_2$ and the like. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt of a complex salt of Group 1-A, Group II-A or Group III-A elements of the periodic Table, dissolved in an appropriate nonaqueous organic solvent. Conventional solvents include propylene carbonate, 1-2-dimethoxyethane (DME), tetrahydrofuran, ethylene carbonate, 3-methyl-2-oxazolidone (3Me2Ox), 3,5-dimethylisoxazole (DMI) or the like.

A multitude of solutes is known and recommended for use but the selection of a suitable solvent has been particularly troublesome since many of those solvents which are used to prepare electrolytes sufficiently conductive to permit effective ion migration through the solution are reactive with the highly reactive anodes described above. Most investigators in this area, in search of suitable solvents, have concentrated on aliphatic and aromatic nitrogen- and oxygen-containing compounds. The results of this search have not been entirely satisfactory since many of the solvents investigated still could not be used effectively with extremely high energy density cathode materials and were sufficiently corrosive to lithium anodes to prevent efficient performance over any length of time.

U.S. Pat. No. 4,071,665 titled "High Energy Density Battery With Dioxolane Based Electrolyte" discloses high energy density galvanic batteries having high utilization of active electrode materials such as lithium anodes, cathode depolarizers reducible by said anodes, such as cupric sulfide, and electrolytes comprising a dioxolane as solvent and up to about 20 weight percent of a conductive non-reactive electrolyte salt such as lithium perchlorate dissolved therein. Optionally up to 50 weight percent of the solvent can be a second solvent which is an aliphatic or cycloaliphatic carbohydric ether to reduce battery gassing. Additional small amounts of a tertiary nitrogen base can be added to suppress the tendency of the electrolyte system to polymerize.

U.S. Pat. No. 4,952,330 titled "Nonaqueous Electrolyte" discloses a nonaqueous electrolyte for cells such as $Li/FeS_2$ cells, comprising a solute, such as $LiCF_3SO_3$, dissolved in a mixture of a major amount of dioxolane (i.e. 40–53 volume percent), a minor amount of propylene carbonate (i.e. 8–18 volume percent) and dimethoxyethane (i.e. 32–45 volume percent). The dioxolane to dimethoxyethane weight ratio for these solutions cover the range of 67:33 to 52:48.

U.S. Pat. No. 3,996,069 titled "Nonaqueous Cell Utilizing a 3Me2Ox-based Electrolyte" discloses a nonaqueous cell utilizing a highly active metal anode, such as lithium, a solid cathode selected from the group consisting of $FeS_2$, $Co_3O_4$, $V_2O_5$, $Pb_3O_4$, $In_2S_3$ and $CoS_2$, and a liquid organic electrolyte consisting essentially of 3-methyl-2-oxazolidone in combination with a low viscosity cosolvent, such as dioxolane, and a metal salt selected, for example, from the group consisting of MSCN, $MCF_3SO_3$, $MBF_4$, $MClO_4$ and $MM'F_6$ wherein M is lithium, sodium or potassium and M' is phosphorus, arsenic or antimony.

U.S. patent application Ser. No 744,179 filed on Aug. 13, 1991 discloses a nonaqueous electrolyte for use in electrochemical cells employing a solute such as $LiCF_3SO_3$ dissolved in a mixture of a dioxolane-based solvent and an acyclic ether solvent, such as dimethoxyethane, in which the weight ratio of the dioxolane-based solvent to the acyclic ether solvent is less than 45:55 and the volume ratio is less than 40:60.

While the theoretical energy, i.e. the electrical energy potentially available from a selected anode-cathode couple is relatively easy to calculate, there is a need to choose a nonaqueous electrolyte for such couple that permits the actual energy produced by an assembled battery to approach the theoretical energy. The problem usually encountered is that it is practically impossible to predict in advance how well, if at all, a nonaqueous electrolyte will function with a selected couple. Although a cell must be considered as a unit having three parts—a cathode, an anode and an electrolyte —and it is to be understood that the parts of one cell are not predictably interchangeable with parts of another cell to produce an efficient and workable cell. It has now been realized that the separator, in conjunction with a specific electrolyte, can play an important part in the performance characteristics of a cell.

Many cell systems can function in various environments when they are freshly produced. However, when cell systems are stored for long periods of time at high temperatures, their impedance characteristics can deteriorate to render the cell systems unsuitable for some consumer applications. A specific harsh application of a cell is its use in cameras where flash amperages at high drain rates are required. Although cells can function under normal conditions, many cells usually exhibit high cell impedance and low amperage under high drain rates as exemplified in flash camera operations.

It is an object of the present invention to provide an electrolyte solution and separator combination for use in an electrochemical cell that can be stored at high temperatures for extended periods of time without allowing cell impedance to increase to levels which substantially reduce cell performance.

Another object of the present invention is to provide an electrolyte solution and separator combination for an electrochemical cell employing a mixture of a dioxolane-based solvent and an acyclic ether as the electrolyte and a separator having a specific pore size, porosity, resistance and tortuosity.

Another object of the present invention is to provide an electrolyte solution and separator combination ideally suited for cells employing a lithium anode and an iron sulfide-containing cathode.

Another object of the present invention is to provide an electrochemical cell employing a lithium anode, a cathode such as $FeS_2$ and an electrolyte solution comprising a solute dissolved in a mixture of dioxolane and 1,2-dimethoxyethane and a separator having a pore size between 0.005 and 5 microns, a porosity between 30 and 70%, a resistance between 2 and 15 ohm-cm$^2$, and a tortuosity of less than 2.5.

The foregoing and additional objects will become more fully apparent from the following description.

SUMMARY OF THE INVENTION

The invention relates to an electrochemical cell comprising an anode, a cathode, a separator between said anode and said cathode, and an electrolyte wherein said electrolyte comprises a solute dissolved in a mixture of a dioxolane and an acyclic ether-based solvent and said separator has a pore size between 0.005 and 5 microns, a porosity between 30% and 70%, a resistance between 2 and 15 ohm-cm$^2$ and a tortuosity of less than 2.5.

As used herein the term dioxolane-based solvent shall mean dioxolane (DIOX), alkyl-substituted dioxolanes or mixtures thereof. Examples of alkyl-substituted dioxolanes are 4-methyl1,3-dioxolane or 2,2-dimethyl-1,3-dioxolane. The preferred dioxolane-based solvent for use in this invention is dioxolane. Typical acyclic ethers suitable for use in this invention are dimethoxyethane, ethyl glyme, diglyme and triglyme. The preferred acyclic ether for use in this invention is 1,2-dimethoxyethane (DME).

For some applications, at least one optional co-solvent may be used such as 3,5-dimethylisoxazole (DMI), 3-methyl-2-oxazolidone (3Me2Ox), propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS) or the like. The preferred co-solvents for use in this invention are 3,5-dimethylisoxazole, 3-methyl-2-oxazolidone and propylene carbonate. For most applications the addition of the optional co-solvent should be limited to 25 weight percent or less based on the total weight of the solvent for the electrolyte, preferably less than 20 weight percent.

The preferred weight ratio of the dioxolane-based solvent to the acyclic ether solvent is from 1:99 to 45:55, more preferably from 10:90 to 40:60 and the most preferred is from 29:71. The most preferred electrolyte solution would be 29.0 weight percent DIOX, 70.8 weight percent DME and 0.2 weight percent DMI along with 1.0 to 1.5 Moles $LiCF_3SO_3$ per liter of solvent.

It has been found that in addition to the electrolyte, a high rate, low resistance separator is required for optimal high rate cell performance. The separator according to this invention must have four specific properties if it is to be used with the electrolyte to produce high rate cell performance. A desired separator material for use in high rate lithium cells consists of microporous extruded or cast films (membranes). The microporous membrane separator must have a pore size range from 0.005 to 5 microns and preferably from 0.005 to 0.3 micron, a porosity range from 30 to 70 percent and preferably from 35 to 65 percent, a resistance range from 2 to 15 ohm-cm$^2$, preferably less than 10 ohm-cm$^2$ and most preferably less than 6 ohm-cm$^2$, and a tortuosity of less than 2.5 and preferably less than 2.0.

The pore size of the separator must be above a minimum value which is necessary for the nonhindered migration of a solvated ion. A solvated lithium ion is on the order of 10 Angstroms or 0.001 micron. Since it is common for organic electrolyte systems to form ion pairs and for at least a monolayer of a electrolyte solvent to line the pore walls of the separator, a minimum pore diameter of 0.005 micron is necessary for the nonimpeded passage of an ion through a pore. As the pore size increases, however, nonporous areas need to also increase in order to provide mechanical strength. The result of increasing these nonporous areas is blockage of a substantial portion of the separator to ion migration. As a result, a large number of moderate size pores is preferred to a few very large pores. Another way of viewing this effect is that the distance between pores may be as important as the pore diameter. Typically, in separators of submicron size, the distance between pores should also be less than a micron. In addition, it is also a function of the separator to form a physical barrier to the passage of electrode particles through the separator which could result in an electrical short between the electrodes. Such particles can be as small as a few microns, thus also limiting the upper desired pore diameter. Consequently the pore size should preferably be in the submicron range or the pores should be sufficiently tortuous to provide a physical barrier to the passage of electrode particles through the separator.

A number of methods are used in the membrane and filter industries to describe the pore size of a porous material. However, none of the standard methods truly defines the typical pore diameter. The difficulty lies with the fact that pores are seldom round and a distribution of pore sizes exists within a given membrane. Examples of common methods used to describe pore diameters include: challenging the membrane with either bacteria or latex spheres of known size, bubble point measurements, photomagnification, and liquid displacement and air flow measurements. This latter method can be performed using a commercial instrument such as the Coulter II Porometer. The Coulter porometer determines the pressure required to overcome the surface tension of a liquid within a wetted pore. The smaller the pore, the greater the pressure required. By comparing the pressure profile of a wetted membrane to a dry membrane, a pore diameter distribution can be determined. The pore diameters for the membranes evaluated were measured by this technique. Pore diameters represent mean pore flow diameters, that is, half of the flow passes through pores larger than this value and half flows through pores smaller than this diameter.

It appears that as porosity or void area of a separator increases so would conductivity through the separator. Under certain conditions this is true, such as with separators produced by nearly the same process. But this value alone as the only physical property upon which to predict resistivity can be misleading. Consider the following conditions which could strongly influence the measured porosity value and the resistivity observed in actual applications:

A large number of pores exist below 0.005 micron.
A few very large pores account for the porosity.
A significant number of pores are not interconnected.

Many pores have restrictions or bottle necks to ion flow.

A minimum porosity of 35% is typically required to provide even moderate ion transport. Porosities greater than 70% typically result in insufficient tensile strength for processing into an electrochemical cell and the need for thicker than desired separators. Preferred separator porosities are between 35% and 65%.

Resistance is perhaps the single most important parameter which can be correlated to electrochemical cell rate capability. Its value is derived from the fact that it is a measured property which is influenced by all other properties such as pore size, number of pores, porosity and tortuosity. The resistance value is a true indicator of the ion transport through the membrane. In the case of lithium cells having organic electrolytes and solid cathodes it has been found that the most preferred resistance value for high rate performance should be 6 ohm-cm$^2$ or less. It has been observed that a separator resistance above 15 ohm-cm$^2$ would hinder the rate performance capability of the cell. Separator area specific resistances were measured between two strips of lithium foil. The electrolyte used consisted of 1.5M LiCF$_3$SO$_3$ in dioxolane and 1,2-dimethoxyethane (25:75 vol. %). Specific conductivity of the electrolyte was 3.46 mS/cm. The separator, about 1 mil thick, was vacuum impregnated with the electrolyte to ensure through pore wetting. The separator thickness served to define the electrode spacing. Stack pressure between electrodes was maintained by winding the lithium strips into a jellyroll which was then sealed in a standard AA cell container. Resistance values were measured by a standard ac resistance method at 25 KHz. Lead and contact resistances were subtracted from the measured values. All values were then standardized to area specific resistances i.e., ohm-cm$^2$.

Tortuosity in its simplest definition is the ratio of actual pore length, i.e., how far an ion has to travel to pass through a separator, to the separator thickness. However this definition assumes that migration through a pore is affected only by distance and does not take other hindrances to migration into account. Such hindrances include: pore bottle necks or pore restrictions, noninterconnected pores or dead ends, inhibited ion flow as ions collide with pore side walls at channel bends, the influence of laminar flow and ion entrapment out of the main ionic migration. Since no model accurately describes the tortuosity of a separator and since the tortuosity of each separator is different, the best indication of separator tortuosity is that estimated from the measured resistance value in electrolyte. The most common method of determining the effective tortuosity of a separator is based on the separator porosity and the ratio of specific conductivity of the separator to that of the electrolyte. Thus, $$\frac{R_{separator}}{R_{solution}} = \frac{Tortuosity^2}{Porosity}$$

or $$Tortuosity = \sqrt{\frac{R_{separator}}{R_{solution}} \times Porosity}$$

where R separator is the resistance in ohms-cm$^2$ of the separator, R solution is the resistance in ohms-cm$^2$ of the electrolyte and porosity in percentage. Although this equation assumes all pores have identical tortuosities, it is accurate for defining the separator of this invention. It has been found that the best high rate separators exhibit tortuosities of less than 2.5 and preferably less than 2.0. A study of commercial separators suggest that high tortuosity may not be so much a result of actual tortuous paths but rather a result of regions of pore blockage. That is, many separators display layered regions of high and low porosity. If the regions of low porosity limit ion transport, the result is a higher resistance value which is reflected in a higher tortuosity value. F. L. Tye described in the Journal of Power Sources Vol. 9 (1983), 89-100, a theoretical calculation of the contribution that pores of varying tortuosities have on overall separator conductivity. Based on this treatment, if a separator contained 50% of its pores at a tortuosity of 1.5 and 50% of its pores at a tortuosity of 4, 88% of the conductivity is a result of the pores at a tortuosity of 1.5. This theoretical treatment of pore structure and separator conductivity supports the observations of measured separator resistances and cell flash amperages. However in reality, a measured resistance and estimated tortuosity do not provide any insight as to whether all the pores have equal tortuosity or if only a small portion of the current is being carried through a few pores of low tortuosity. Different cell performances would be expected based on the distribution of pore tortuosities. As a result all four separator parameters must be measured and specified to ensure that the observed synergistic effect is demonstrated in the electrochemical cell.

Another category of separators produced from microfibers, such as by melt blown nonwoven film technology, is also useful. Such films typically possess pores of several microns in diameter but displaying less tortuous paths. However, the best materials of this category would have pore sizes within the upper portion of the range recited herein, and their tortuosities would still be below 2.5.

Highly active metal anodes suitable for this invention include lithium (Li), sodium (Na), potassium (K), calcium (Ca), magnesium (Mg) and their alloys and metal-intercalated carbon or graphite material such as lithiated carbon. Of these active metals, lithium would be preferred because, in addition to being a ductile, soft metal that can easily be assembled in a cell, it possesses the highest energy-to-weight ratio of the group of suitable anode metals.

Cathodes for use in this invention are solid electrodes which include fluorinated carbon represented by the formula (CF$_x$)$_n$ wherein x varies between about 0.5 and about 1.2 and (C$_2$F)$_n$ wherein in both cathodes the n refers to the number of monomer units which can vary widely, copper sulfide (CuS), copper oxide (CuO), lead dioxide (PbO$_2$), iron sulfides (FeS, FeS$_2$), copper chloride (CuCl$_2$), silver chloride (AgCl), sulfur (S), bismuth trioxide (Bi$_2$O$_3$), copper bismuth oxide (CuBi$_2$O$_4$), cobalt oxides, vanadium pentoxide (V$_2$O$_5$), tungsten trioxide (WO$_3$), molybdenum trioxide (MoO$_3$), molybdenum disulfide (MoS$_2$), titanium disulfide (TiS$_2$), transition metal polysulfides, lithiated metal oxides and sulfides, such as lithiated cobalt and/or nickel oxides, lithiated manganese oxides, Li$_x$TiS$_2$ and Li$_x$FeS$_2$.

The preferred cathodes for use in this invention are the iron sulfides alone and in combination with other cathode materials such as:

FeS$_2$+CuO $FeS_2 + Bi_2O_3$ $FeS_2 + Pb_2Bi_2O_5$ $FeS_2 + Pb_3O_4$ $FeS_2 + CuO + Bi_2O_3$ $FeS_2 + CuO + Pb_3O_4$ $FeS_2 + CuO + CoS_2$ $FeS_2 + MnO_2$ $FeS_2 + CoS_2$

The ionizable solute for use in this invention may be a simple salt such as $LiCF_3SO_3$ or lithium bistrifluoromethylsulfonyl imide ($Li(CF_3SO_2)_2N$) or a double salt or mixtures thereof which will produce an ionically conductive solution when dissolved in these solvents. Suitable solutes are complexes of inorganic or organic Lewis acids and inorganic ionizable salts. One of the requirements for utility is that the salts, whether simple or complex, be compatible with the solvent(s) being employed and that they yield a solution which is sufficiently ionically conductive, e.g., at least about $10^{-4}$ ohm$^{-1}$ cm$^{-1}$. Generally, an amount of at least about 0.5M (moles/liter) would be sufficient for most cell applications.

Useful ionizable salts include lithium fluoride, lithium chloride, lithium bromide, lithium sulfide, sodium fluoride, sodium chloride, sodium bromide, potassium fluoride, potassium chloride and potassium bromide.

The ionizable solute for use in conjunction with iron sulfide-containing cathodes would be lithium trifluoromethane sulfonate ($LiCF_3SO_3$), lithium bistrifluoromethylsulfonyl imide ($Li(CF_3SO_2)_2N$), lithium perchlorate ($LiClO_4$), lithium hexafluoroarsenate ($LiAsF_6$) or mixtures thereof with lithium trifluoromethane sulfonate being the most preferred. Suitable double salts for various cell applications would be lithium tetrafluoroborate ($LiBF_4$), lithium hexafluorophosphate ($LiPF_6$) and potassium hexafluoroarsenate ($KAsF_6$).

EXAMPLE

Sample lithium—$FeS_2$ cells were produced using different electrolytes and separators. The electrolyte either consisted of 25 volume percent 1,3-dioxolane, 75 volume percent DME, 0.2% DMI and 1.5M $LiCF_3SO_3$ (Sample A) or a 50 volume percent DIOX, 40 volume percent DME, 10 volume percent 3Me2Ox and 1.5M $LiCF_3SO_3$ (Sample B). The separator was either a Celgard type 2500 separator (Celgard is a trademark of Hoechst-Celanese Corp.) having a pore size of 0.067 micron, a porosity of 45.1%, a resistance of 5.05 ohm-cm$^2$ and a tortuosity of 1.63 (Sample 1); a separator having a pore size of 0.090 micron, a porosity of 53.7%, a resistance of 12.45 ohm-cm$^2$ and a tortuosity of 2.90 (Sample 2) or a separator having a pore size of less than 0.05 micron, a porosity of 38.0%, a resistance of 9.77 ohm-cm$^2$ and a tortuosity of 2.72 (Sample 3). Each cell was tested for flash amperage which consisted of 200-millisecond closed circuit voltage on a 0.01-ohm load. The flash amperage and impedance were measured and are shown in the Table.

TABLE

| electrolyte (Sample) | Separator (Sample) | Flash Amperage (Ampere) | Impedance (mohm) |
|---|---|---|---|
| A | 1 | 19 | 80 |
| A | 2 | 10.6 | 140 |
| A | 3 | 13 | 120 |
| B | 1 | 16 | 200 |
| B | 2 | 9.1 | 220 |
| B | 3 | 12 | 190 |

The data in the Table show that synergistic effects can be obtained using the specific electrolyte and separator combination of this invention. For example, using the electrolyte and separator combination of this invention (Sample A and Sample 1 combination) a flash amperage of 19 amperes and impedance of 80 miliohms can be obtained.

While the present invention has been described with reference to many particular details thereof, it is not intended that these details shall be construed as limiting the scope of this invention.

What is claimed:

1. An electrochemical cell comprising an anode, a cathode, a separator between said anode and said cathode, and an electrolyte wherein said electrolyte comprises a solute dissolved in a mixture of a dioxolane and an acyclic ether-based solvent and said separator has a pore size between 0.005 and 5 microns, a porosity between 30% and 70%, a resistance between 2 and 15 ohm-cm$^2$ and a tortuosity of less than 2.5.

2. The electrochemical cell of claim 1 wherein the pore size of the separator is from 0.005 to 0.3 micron.

3. The electrochemical cell of claim 1 wherein the tortuosity is less than 2.

4. The electrochemical cell of claim 1 wherein the porosity of the separator is between 35% and 65%.

5. The electrochemical cell of claim 1 wherein the resistance of the separator is less than 10 ohm-cm$^2$.

6. The electrochemical cell of claim 1 wherein the pore size of the separator is from 0.005 to 0.3 micron and the porosity of the separator is between 35% and 65%.

7. The electrochemical cell of claim 6 wherein the resistance of the separator is less than 6 ohm-cm$^2$.

8. The electrochemical cell of claim 7 wherein the tortuosity is less than 2.

9. The electrochemical cell of claim 1 wherein the weight ratio of the dioxolane-based solvent to acyclic ether solvent is from 1.99 to 45:55.

10. The electrochemical cell of claim 9 wherein the weight ratio of the dioxolane-based solvent to acyclic ether solvent is from 10:90 to 40:60.

11. The electrochemical cell of claim 9 wherein the pore size of the separator is from 0.005 to 0.3 micron and the porosity of the separator is between 35% and 65% and the resistance is less than 10 ohm-cm$^2$.

12. The electrochemical cell of claim 11 wherein the anode is lithium and the cathode is selected from the group consisting of fluorinated carbon, a metal sulfide, a metal oxide, a lithiated metal oxide, a lithiated metal sulfide, a metal chloride and mixtures thereof.

13. The electrochemical cell of claim 12 wherein the cathode is $FeS_2$.

14. The electrochemical cell of claim 1 wherein the dioxolane-based solvent is dioxolane.

15. The electrochemical cell of claim 1 wherein the acyclic ether is selected from the group consisting of dimethoxyethane, ethyl glyme, diglyme and triglyme.

16. The electrochemical cell of claim 15 wherein the acyclic ether solvent is 1,2-dimethoxyethane.

17. The electrochemical cell of claim 16 wherein the dioxolane-based solvent is dioxolane.

18. The electrochemical cell of claim 1 wherein at least one co-solvent is included in the electrolyte solvent.

19. The electrochemical cell of claim 18 wherein the co-solvent is present in an amount less than 25 wight percent based on the weight of the solvent of the electrolyte solution and wherein the co-solvent is selected from the group consisting of 3,5-dimethylisoxazole, 3-methyl-2-oxazolidone, propylene carbonate, ethylene carbonate, butylene carbonate and sulfolane.

20. The electrochemical cell of claim 19 wherein the dioxolane-based solvent is dioxolane, the acyclic ether solvent is 1,2-dimethoxyethane, the weight ratio of the dioxolane to the 1,2-dimethoxyethane is from 10:90 to 40:60 and wherein the co-solvent is 3,5-dimethylisoxazole or 3-methyl-2-oxazolidone.

* * * * *